(12) United States Patent
Delchambre et al.

(10) Patent No.: US 11,092,705 B2
(45) Date of Patent: Aug. 17, 2021

(54) DIAGNOSTIC DEVICE FOR A SEISMIC PROBE AND ASSOCIATED METHOD

(71) Applicant: ENE29 S.ÀR.L., Luxembourg (LU)

(72) Inventors: Michaël Delchambre, Toulouse (FR); Sergei Labuda, Pins Justaret (FR); Xavier Horsot, Fonsorbes (FR)

(73) Assignee: Michaël Delchambre, Toulouse (FR)

( * ) Notice: Subject to any disclaimer, the term of this patent is extended or adjusted under 35 U.S.C. 154(b) by 592 days.

(21) Appl. No.: 15/771,978

(22) PCT Filed: Oct. 24, 2016

(86) PCT No.: PCT/EP2016/075538
§ 371 (c)(1),
(2) Date: Apr. 27, 2018

(87) PCT Pub. No.: WO2017/072069
PCT Pub. Date: May 4, 2017

(65) Prior Publication Data
US 2018/0348386 A1    Dec. 6, 2018

(30) Foreign Application Priority Data

Oct. 29, 2015    (FR) ..................................... 15.60379

(51) Int. Cl.
| | | |
|---|---|---|
| *G01V 1/157* | (2006.01) | |
| *G01V 1/52* | (2006.01) | |
| *G10K 15/06* | (2006.01) | |

(52) U.S. Cl.
CPC ................ *G01V 1/157* (2013.01); *G01V 1/52* (2013.01); *G01V 2001/526* (2013.01); *G10K 15/06* (2013.01)

(58) Field of Classification Search
CPC .... G01V 1/157; G01V 1/52; G01V 2001/526; G10K 15/06
See application file for complete search history.

(56) References Cited

U.S. PATENT DOCUMENTS

| | | | | |
|---|---|---|---|---|
| 2,708,485 A | * | 5/1955 | Vogel ....................... | G01V 1/44 367/71 |
| 2005/0263340 A1 | * | 12/2005 | Shehab .................... | G01V 1/04 181/121 |

(Continued)

FOREIGN PATENT DOCUMENTS

WO    2010/146016 A1    12/2010

OTHER PUBLICATIONS

International Preliminary Report on Patentability from corresponding International application No. PCT/EP2016/075538, dated May 16, 2018.

(Continued)

*Primary Examiner* — Isam A Alsomiri
*Assistant Examiner* — Amie M Ndure
(74) *Attorney, Agent, or Firm* — Ipsilon USA, LLP

(57) ABSTRACT

Disclosed is a diagnostic device for a seismic probe, the probe including, in an elongate tubular body, an electronic module, a capacitor bank and a spark gap adapted to generate a shock wave in a wellbore, the device including at least one sensor adapted to measure at least one parameter of the shock wave over time. The sensor is fixed to an inner surface of a wall of the tubular body, at a predetermined, non-zero distance from the spark gap in the direction of the electronic module. Also disclosed is a diagnostic method using the signals of the sensor.

20 Claims, 2 Drawing Sheets

(56) References Cited

U.S. PATENT DOCUMENTS

Figure 1:
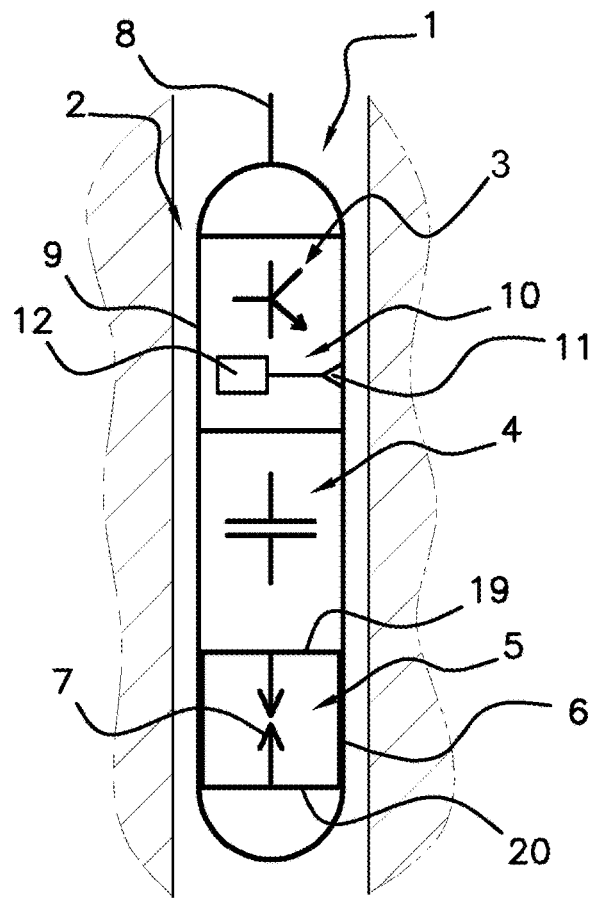

| | | | |
|---|---|---|---|
| 2006/0044940 A1 | 3/2006 | Hall et al. | |
| 2007/0029197 A1* | 2/2007 | DiFoggio | F04B 17/003 |
| | | | 204/450 |
| 2009/0288820 A1* | 11/2009 | Barron | E21B 43/267 |
| | | | 166/249 |
| 2011/0080805 A1* | 4/2011 | Vu | G01V 1/46 |
| | | | 367/32 |
| 2011/0122727 A1* | 5/2011 | Gleitman | G01V 1/46 |
| | | | 367/81 |
| 2012/0285702 A1 | 11/2012 | Rytlewski | |
| 2015/0300161 A1* | 10/2015 | Kamata | G01V 1/364 |
| | | | 166/250.01 |
| 2017/0023620 A1* | 1/2017 | Bondarenko | G01R 17/02 |
| 2017/0045633 A1* | 2/2017 | Moncho | E21B 43/003 |
| 2020/0080270 A1* | 3/2020 | Landskroon | G01V 1/44 |

OTHER PUBLICATIONS

International Search Report, dated Dec. 22, 2016, from corresponding PCT/EP2016/075538 application.

* cited by examiner

DIAGNOSTIC DEVICE FOR A SEISMIC PROBE AND ASSOCIATED METHOD

The invention relates to a diagnostic device for a seismic wave-generating probe adapted to be lowered into a wellbore and to fire shots to emit a shock wave into the well. The invention also relates to an associated diagnostic method.

In exploration such as in oil drilling, geological operations or mining, it is conventional to use probes which are lowered down a wellbore to a predetermined depth and which are used to emit, within the rock, shock waves or pressure waves, more generally referred to as seismic waves, which propagate into the rock, either to detect—by reflection or refraction—breaks in continuity in the rock layer (in exploration) or to dislodge a resource (gas or oil) and to allow it to be extracted (in drilling).

Such a probe is generally in the form of an elongate tubular body, having a diameter in the order of 5 to 30 cm and a length which can be about 10 metres, or even more. A first end of the body of the probe is linked to one or more connecting cables which ensure on the one hand mechanical connection between the probe and a winching system at the surface to be able to lower and raise the probe within the wellbore, and on the other hand the supplying of the probe with electrical power from an external electric generator which is also placed on the surface at the wellhead. The connecting cable is likewise adapted to carry information from the probe to an operator station at the wellhead, and vice-versa.

Throughout the present text, the terms "top" and "bottom" as well as the related qualifiers (upper, lower, etc.) are used to designate a position along the axis of the probe, considered in the vertical, in-use position. In the present case, the highest point of the probe is its point of attachment to the connecting cable at the surface.

The connecting cable is linked to an electrical and electronic module contained in a first part of the body close to this first end. This module comprises for example means for controlling and supplying a capacitor bank storing the energy provided by the external electric generator at high tension. This capacitor bank takes up the central part of the body of the probe and is connected to a spark gap placed at the end of the body opposite the cable. During firing, the capacitor bank is discharged through the spark gap, a high-power electric arc is generated and vaporises a fluid, generally water, surrounding the electrodes of the spark gap. This instantaneous vaporisation, of a quasi-explosive type, generates "seismic" shock and/or pressure waves which are diffused around the spark gap, if applicable through a flexible membrane surrounding the spark gap and communicate with the liquid filling the wellbore and into the neighbouring rock. The spark gap can likewise be produced in the form of a conductor wire connecting the two electrodes. During firing, the capacitor bank is discharged through the wire which instantaneously vaporises and thereby generates the seismic waves.

However, these shock waves are generally emitted at a great depth and their effect, in particular in drilling/mining mode, is not immediately perceptible. It is thus necessary to verify that the probe is in the operating state and that the shock waves are indeed being emitted.

There is known, for example from document WO2010/146016, a probe comprising various sensors exposed to the external environment and providing information to an operator at the surface regarding the operating conditions of the probe. In particular, a high-frequency pressure sensor allows the shock wave signature to be monitored by measuring the pressure variation over time during firing. However, exposing the sensor to the environment outside the probe reduces its service life and the probability of a false diagnosis of a breakdown of the probe connected with a breakdown of the sensor is high. Furthermore, it is necessary to have an operator at the surface to monitor the provided information and to take the necessary steps.

The invention thus relates to a diagnostic device for a seismic probe which is simple and reliable and does not have the disadvantages of the prior art.

The invention also relates to a such a device which is economic and easy to maintain.

The invention also relates to a diagnostic method for such a seismic probe which can operate autonomously and provide precise information regarding the operation of the probe.

In accordance with a particular aspect, the invention relates to a diagnostic device which can render the probe safe in the event of an anomaly.

To this end, the invention relates to a diagnostic device of a seismic probe, said probe comprising, in an elongate tubular body, an electronic module, a capacitor bank and a spark gap adapted to generate a shock wave in a wellbore, said device comprising at least one sensor adapted to measure at least one parameter of the shock wave over time, characterised in that said sensor is fixed to an inner surface of a wall of the tubular body, at a predetermined, non-zero distance from the spark gap in the direction of the electronic module and adapted to measure the shock wave directly transmitted by the wall of the tubular body.

The inventors have noticed that it was not necessary to place the sensor on the outside of the seismic probe. In fact, the shock wave generated between the electrodes of the spark gap propagates in a substantially spherical shape and generates various types of stress in the walls of the body. In particular, the shock wave generated between the electrodes causes a stress on the upper electrode of the spark gap which is transmitted to the metal parts to which it is connected and propagates to the tubular body of the probe.

By placing the sensor directly in contact with the inner surface of the wall of the body of the probe, it is possible—owing to different propagation times—to measure only the shock wave transmitted directly by the wall of the body of the probe and not the shock wave reflected or refracted by the walls of the well and the surrounding rock formations. In fact, the variations in diameter of the well and surrounding rock formations introduce delays and modifications in the shock wave. These delays and modifications which are useful for investigating and measuring the characteristics of the rock formations surrounding the wellbore are prejudicial to a diagnostic of the operation of the probe itself. It is for example difficult, if not impossible, to distinguish between an attenuation of the signal measured by the sensor caused by the external environment (increase in the diameter of the well, more permeable rock formations, etc.) and an attenuation caused by a decrease in the amount of energy provided to the spark gap or a deterioration of the electrodes. Consequently, by measuring the signal of the shock wave directly transmitted by the body of the probe, it is possible to ignore the variations caused by the surrounding environment and to obtain a signal free from bias which could result in an erroneous diagnostic.

Other modes of transmission of stress are possible based on the structure of the probe. For example, when the spark gap is fitted with a flexible membrane allowing the fluid within the spark gap to be isolated from the fluid outside of the probe, the shock wave generated during firing causes a deformation of this membrane in a radial direction. Since the membrane is embedded in the tubular body of the probe, it communicates to the tubular body a radial stress which propagates along the body, on both sides of the spark gap, and in particular towards the top of the probe. Consequently, a sensor placed within the tubular body, in contact with and/or fixed to an inner wall of said body is able to measure this stress.

Within the body of the probe, the sensor is protected from the stresses of the environment which prevail outside of the probe such as operating in liquid or muddy environments, at high temperature, possibly in acidic environments, etc. Furthermore, a sensor placed outside of the probe could be torn off or damaged during shocks or friction against the wall of the well.

Taking into account the extremely short duration of a shock wave (several microseconds to several hundreds of microseconds), a sensor which is able to measure a high-frequency stress signal is preferably used. The position of the sensor along the longitudinal axis is selected such that the fraction of energy of the shock wave transmitted by the tubular body of the probe is substantially attenuated so as not to destroy the sensor. Preferably, the sensor is placed above the spark gap and, in order to retain a necessary proximity between the capacitor bank and the spark gap, above the capacitor bank. However, when the probe is formed of several sections, the sensor is preferably placed in the same section as the spark gap so that the stress signal is not attenuated too much by the coupling devices between sections. In practice, a distance varying from two to four metres between the spark gap and the position of the sensor has proved to be optimum.

Advantageously and in accordance with the invention, the sensor is selected from the group formed of accelerometers, strain gauges and dynamic pressure sensors. Based on the type of sensor and the type of stress signal to be measured, the sensor is fixed radially directly on the inner wall of the body of the probe or can be installed along an axis in parallel with that of the probe, on a transverse wall, orthogonal to the axis of the probe, in the immediate vicinity of the wall of the body of the probe.

Advantageously and in accordance with the invention, the sensor has at least one measuring direction orthogonal to the wall of the body of the probe. The inventors have in fact noted that during firing a first axial stress peak occurs corresponding to a traction/compression force on the body followed by a series of radial stress waves corresponding to a bending mode of the tubular body generated by an oscillation of the walls of the tube. These radial stress waves have frequency and amplitude characteristics containing more information, and being more easily measurable, than the axial stress peak.

Advantageously and in accordance with the invention, the device comprises a computer adapted to receive a signal output by the sensor during firing of the probe. This computer may be analogue, for example comprising one or more rectifiers and analogue integration means for obtaining a voltage which is an image of the energy of the signal, or may preferably be digital.

Advantageously and in accordance with the invention, said computer comprises sampling and analogue-digital conversion means, memory means and calculation means adapted to perform at least one operation of digitally processing said signal output by the sensor. The sensor is thus connected to a computer comprising calculating means, memories and means for digitising the signal of the sensor allowing it to be recorded or allowing at least some of its characteristics to be recorded, such as frequency and/or amplitude, allowing application thereto of digital processing, such as integration of the rectified signal etc. to derive therefrom a reference value and to compare the instantaneous signal with this reference value. Other processing can likewise be envisaged, such as e.g. using the signal obtained during the previous shock wave as a reference value.

Advantageously and in accordance with the invention, the diagnostic device further comprises a member for slow discharge of the capacitor bank adapted to be used when a failure is detected during firing of the probe. In the event of a firing anomaly or failure, the capacitor bank can remain charged, if need be in an unstable state, and returning the charged probe to the surface can prove dangerous. The diagnostic device thus further comprises a member allowing the capacitor bank to be discharged, either by a command sent from the surface, or autonomously when the anomaly is detected locally. The discharging member can simply be a resistor of suitable value switched in parallel across the terminals of the capacitor bank by a cut-off switch controlled by the electronic computer processing the signal of the sensor.

The invention likewise relates to a diagnostic method for a seismic probe, said probe comprising, in an elongate tubular body, an electronic module, a capacitor bank and a spark gap adapted to effect firing, generating a shock wave in a wellbore, said method being characterised in that:

a probe is used which is equipped with a sensor adapted to measure at least one parameter of the shock wave over time, said sensor being fixed to an inner surface of a wall of the body at a predetermined, non-zero distance from the spark gap, a signal output by said sensor is recorded by a computer during firing, the recorded signal is processed and compared with at least one reference value, and based on the result of the comparison, the computer outputs information representing the operating state of the probe.

By using a probe equipped with a sensor adapted to record e.g. the acceleration experienced by the body of the probe over time or even a variation in pressure in the fluid surrounding the probe, it is possible to detect the presence or absence of a shock wave after triggering firing by observing the signal collected by the sensor. If firing has failed, for various reasons, e.g. wear on the electrodes of the spark gap, insufficient charging of the capacitor bank, etc. the signal recorded by the sensor over time has characteristics which are very different from a signal collected during successful firing.

Advantageously and in accordance with the invention, the recorded signal is sent in real time to an operator station at the wellhead. In a first operating mode of the method, the signal is sent to the surface where an operator analyses the form of this signal and controls, if need be, an adaptation of the charging parameters of the capacitor bank or the parameters of the spark gap, e.g. distance between electrodes, etc.

Alternatively or in combination, in accordance with the invention the signal is recorded in a memory forming part of the on-board computer in the probe. The data relating to each firing are thus registered in a memory acting as a "black box". These data can thus be used in a deferred manner, after the probe has been raised, or during maintenance phases thereof.

Advantageously and in accordance with the invention, a plurality of signals output by the sensor and recorded are used to calculate said at least one reference value. Local processing of said signals is effected by the on-board computer in the probe to extract therefrom multiple data relating to the different firings and allows a reference value to be provided, with which the signal collected during the next firing will be compared.

Advantageously and in accordance with the invention, at least one of the reference values is determined from an energetic average of the recorded signals. By calculating the energy provided for each firing, for example by integrating, with respect to time, the squared acceleration value provided by the signal, an energetic average of the signals is obtained for a plurality of firings, with which the energy of the last signal is compared and an anomaly is concluded to be present if the energy of the last signal is much less than the calculated energetic average.

Alternatively or in combination, in accordance with the invention, at least one of the reference values is obtained from a spectral analysis of the recorded signals. The processing performed by the computer can likewise consist of a spectral analysis of the signal in which the frequency and amplitude values of the signal are extracted from the signal and recorded to then be compared with an average of these values obtained from a plurality of firings.

Advantageously and in accordance with the invention, the method comprises an additional step of automatically adapting control parameters of the probe when the computer outputs information representing an anomaly in the operation of the probe. Depending upon the programming of the computer, this can affect some operating parameters of the probe so as to modify the spectrum of the generated shock wave. For example, the computer can modify the charging level of the capacitor bank or regulate some parameters of the spark gap such as the distance between electrodes. These adjustments can also be corrected and/or supplemented by other measures from various other sensors such as temperature or pressure sensors.

Advantageously and in accordance with the invention, at least one additional step is a step of rendering the probe safe, said step comprising stopping the power supply to the capacitor bank and switching a slow discharge member between the electrodes of the capacitor bank. When an anomaly is detected, either by direct observation of the transmitted signal at the surface or by local comparison with a reference value, this can mean that no shock wave has been emitted and that the capacitor bank is liable to still be charged. Such an anomaly can occur, for example, when the electrodes of the spark gap are spaced abnormally, for example owing to premature wear. In this case, in order to ensure the safety of the people present when the probe is raised or to avoid any short-circuit likely to damage the equipment, the placing of a charge resistor in series between the terminals of the capacitor bank is effected, so as to discharge same.

The invention also relates to a device and a diagnostic method for a seismic probe which are characterised in combination by all or some of the features mentioned above or below.

Figure 2:
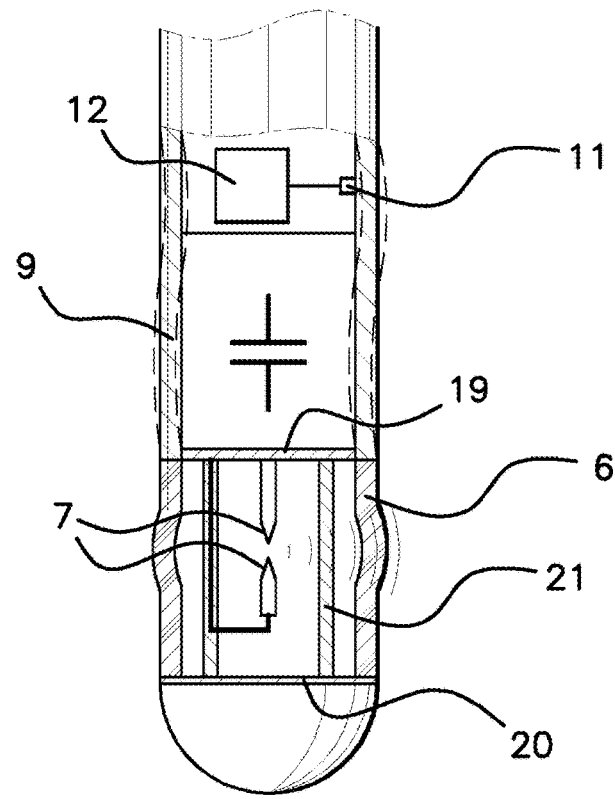
Figure 3:
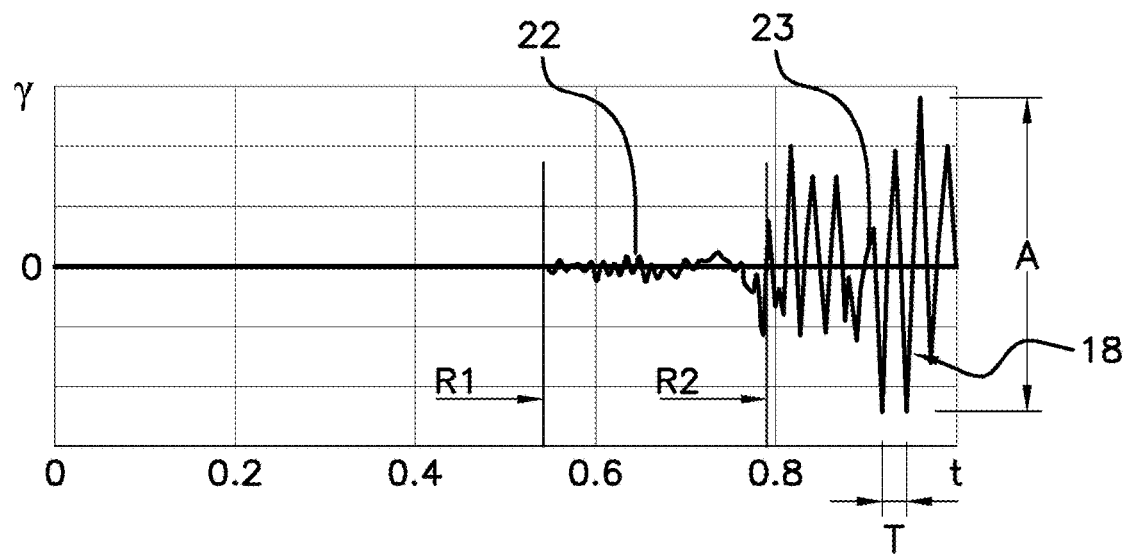
Figure 4:
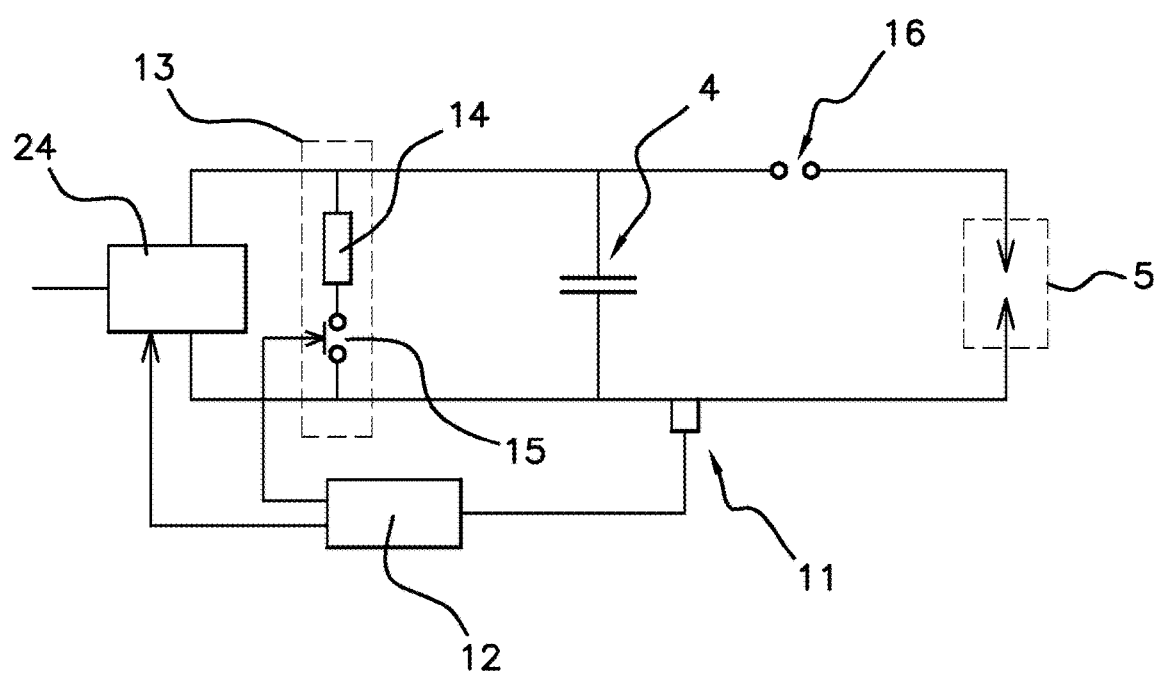

Other aims, features and advantages of the invention will become apparent in view of the following description and the accompanying drawings, in which:

FIG. 1 is schematic view of a seismic probe provided with a device in accordance with the invention, FIG. 2 is a diagram illustrating the operation of the device, FIG. 3 shows a waveform sensed by the device in accordance with the invention, and FIG. 4 is a wiring diagram illustrating the function of rendering the device in accordance with the invention safe.

FIG. 1 schematically shows a seismic probe 1 placed in a wellbore 2. At its upper part, the probe 1 is connected to the surface by a connecting cable 8 ensuring a mechanical connection allowing the probe to be lowered and raised in the well and an electrical and electronic connection with the surface to supply the probe with energy and transmit information from or to the surface. The probe 1 comprises a tubular body 9 within which there are housed, from top to bottom, an electrical module 3 comprising means for regulating the charge of a capacitor bank, a capacitor bank 4 and a spark gap 5.

The electrical module 3 likewise comprises a diagnostic device 10 for the good operation of the probe 1 during firing. This diagnostic device 10 comprises at least one sensor 11, e.g. an accelerometer sensor 11 capable of measuring accelerations at high frequencies and an electronic computer 12 comprising memory and calculation means, e.g. a microcontroller provided with a RAM and/or EEPROM for recording values and a ROM for the program instructions as well as analogue/digital conversion means capable of transforming the analogue values provided by the sensor 11 into digital values able to be stored in the memory means.

The sensor 11 is preferably placed in contact with the inner wall of the tubular body 9 at a distance of the order of two to four metres above the spark gap. If the body 9 is formed of several nested sections, the sensor 11 is preferably placed on the same section as the spark gap 5 so as to avoid the connections between sections impairing the transmission of accelerations along the body 9.

The spark gap 5 of the probe 1 comprises at least two electrodes 7 placed facing each other in a housing, named discharge chamber 17. This chamber 17 contains a fluid, e.g. an aqueous solution.

The chamber 17 is delimited at the top and bottom respectively by upper 19 and lower 20 partitions transverse to the body 9, and is delimited at its periphery by a tubular peripheral membrane 6. Struts 21 maintain the spacing between the partitions 19 and 20. The membrane 6 is formed from elastomer, preferably fluoroelastomer. The membrane 6 can also be metallic or even formed from a thermoplastic synthetic material. In the case of a wire spark gap, the membrane can be replaced by a metallic grid which aims to prevent the intrusion of particles which could disrupt the electrical discharge. The ends of the membrane 6 are embedded in the walls of the tubular body 9 above and below the spark gap 5. The chamber 17 is thus isolated in a sealed manner from the external environment (mud, hydrocarbons, etc.) within the well 2 so as to avoid this external environment from disrupting an electrical discharge triggered between the electrodes 7. The electrodes 7 are electrically connected to the terminals of the capacitor bank 4 via a switch 16 (FIG. 4).

During firing, the switch 16 closes and places the capacitor bank 4 in series with the electrodes 7 of the spark gap 5. The discharging which thus occurs between the electrodes locally vaporises the fluid, thereby generating a shock wave which propagates along a sphere of increasing radius centred on the gap between the two electrodes 7. The walls of the discharge chamber of the spark gap 5 are thus mainly subjected to two types of stress which are retransmitted to the body 9. The first type of stress is a compression wave for which the deformation exerted on the body 9 moves axially in the same direction as the propagation of the wave. The second type of stress is a flexural/shear wave in which the deformation exerted on the body 9 is orthogonal to the direction of propagation.

Reference is made to FIG. 3 which shows the stresses generated by firing in relation to a signal 18 provided by the sensor 11 of the diagnostic device 10. The first stress is an axial compression stress exerted by the electrodes 7 on the partitions 19 and 20 and retransmitted thereby to the wall of the body 9. This stress moves at a speed of the order of 5000 m/s in the steel of the body. The sensor 11 translates this stress by a first part 22 of the signal 18 which has a delay R1 of the order of 0.5 ms (for a distance of the order of 2.50 m to 3 m between the spark gap and the sensor) with respect to the firing.

Immediately after the axial stress, the sensor 11 measures a radial flexional stress which it translates by a second part 23 of the signal 18. This flexional stress is translated into a radial oscillation as shown, in an exaggerated manner for ease of understanding, in FIG. 2. This radial oscillation propagates along the body 9 in the direction of the sensor 11 at a speed less than that of the axial stress of the order of 3000 m/s in the steel of the body and is detected with a delay R2 of the order of 0.8 ms.

However, the second part 23 of the signal representing this radial stress has the advantage of having an acceleration amplitude A of six to ten times greater than that of the axial stress (of the order of $3.10^5$ m/s$^2$) and a frequency less than half (35 kHz instead of 75 kHz), and thus a period T double that of the first part 22 of the signal which makes it easier to use with less expensive acceleration sensors 11.

Of course, these values are given by way of example under particular conditions and are likely to vary based on the firing energy, characteristics of the materials of the membrane and of the body, conditions of the environment in which the probe is placed during firing, etc. However, for a given probe, the signals picked up by the sensor are sufficiently comparable to allow a distinction to be made, after processing, between failed firing and successful firing.

The signal 18 emitted by the sensor 11 is sent to the computer 12 for processing. In a preferred version of the invention, the computer 12 comprises means for sampling and converting, from analogue to digital, the signal 18, and memory means for recording the digital image of this signal.

The signal can be processed in different ways. When an operator is present at the surface, at the wellhead, and has the appropriate equipment at his disposal, it is possible to send the signal 18 to the surface via the connecting cable 8 in real time. In this case, a simple visual analysis of the signal allows a determination to be made as to whether or not the firing has in fact satisfactorily taken place and allows the necessary steps to be taken if it has not.

However, it may be preferable to record a plurality of signals 18 obtained during many firings and to carry out statistical processing so as to define a typical signal representing successful firing and to compare it with the data from subsequent firings. However, in order to simplify the operations performed by the computer 12, it is preferable to define, from each signal, a value representing same, e.g. a measurement of the energy of the signal obtained e.g. by summing the absolute values of the samples of the signal 18. By averaging the energy values of the recorded signals, a reference value is calculated and by comparing the value of the energy of each signal to that of the reference value, it is possible to distinguish between successful firing and failed firing. Conventional statistical processing consists of taking a smoothed average of the collected values, eliminating the values corresponding to a failure and comparing each value with the average plus or minus one, two or three standard deviations based on the desired selectivity for the test.

Other processing of the signals 18 provided by the sensor 11 during a plurality of firings can be performed from an analysis of the wave 23 of the second part of the signal 18. In this case, the value representing the effectiveness of the firing can be the frequency (or period) of the wave 23 and a reference value is taken with which to compare each firing of an average of these frequency values in a similar manner to the preceding test. Other reference values can likewise be extracted from other characteristics of the wave 23, e.g. from its spectral analysis.

It is thus possible to locally determine, by the on-board computer 12 in the probe 1, if the triggered firing has progressed satisfactorily or not and to take certain corrective action without it being necessary for an operator to take action from the surface.

For example, it is possible to perform an additional step of automatically adapting the control parameters when the computer 12 outputs information representing an anomaly in the operation of the probe. When an anomaly is detected, the computer 12 can automatically adjust (without the intervention of the operator) some control parameters so as to modify the spectrum of the shock wave. The thus adjustable control parameters include, for example, the charge level of the capacitor bank or parameters of the spark gap, e.g. the distance between electrodes. Other data measured by sensors of another type, such as pressure or temperature, can be taken into account to adjust these control parameters.

Reference is now made to FIG. 4 of the accompanying drawing to describe another example of such a corrective action. For example, if triggered firing has not taken place for various reasons such as wear or breakdown of a faulty electrode 7 of the switch 16 etc., it is possible for the capacitor bank 4 to remain charged. This electric charge which is considerably high (several kilo amperes under voltages ranging from several kilovolts to several tens of kilovolts) can be a considerable danger to the probe itself and to operators likely to work on the probe during maintenance.

The diagnostic device 10 thus further comprises safety means in the form of a member 13 for slow discharge of the capacitor bank 4. Such a member can simply be formed of a resistor 14 adapted to dissipate the energy accumulated in the capacitor bank and of a cut-off switch 15 controlled by the computer 12, said resistor and switch being mounted in series between the power supply terminals of the capacitor bank.

In the event of a firing anomaly being diagnosed, the computer 12 controls the stopping of the power supply 24 contained within the electrical module 3 used to control the charge of the capacitor bank. Simultaneously or immediately afterwards, the computer 12 controls the closing of the cut-off switch 15 which connects the resistor 14 in series between the terminals of the capacitor bank. The charge of the capacitor bank is thus dissipated in the resistor 14 and no longer represents a risk for maintenance operators.

Of course, this description is given by way of illustrative example only and the person skilled in the art will be able to make numerous modifications without departing from the scope of the invention, such as for example defining other types of test using other reference values, e.g. the amplitude A of the acceleration peak measured by the sensor 11. Similarly, other corrective actions can be defined and triggered by the computer 12 in the event of an anomaly, e.g. switching other capacitors within the capacitor bank, etc.

The invention claimed is:

1. A diagnostic device for a seismic probe, said probe having:

in an elongate tubular body, an electronic module,
a capacitor bank and
a spark gap adapted to generate a shock wave in a wellbore,
said device comprising:
at least one sensor adapted to measure at least one parameter of the shock wave over time, wherein:
said sensor is fixed to an inner surface of a wall of the tubular body, at a predetermined, non-zero distance from the spark gap in the direction of the electronic module and adapted to measure the shock wave directly transmitted by the wall of the tubular body,
said device further comprises a computer adapted to: record, during firing, a signal output by said sensor, process the recorded signal and compare it with at least one reference value, and based on the result of the comparison, output information representing the operating state of the probe, allowing a distinction to be made, after processing, between failed firing and successful firing.

2. The diagnostic device according to claim 1, wherein the sensor is selected from the group formed of accelerometers, strain gauges and dynamic pressure sensors.

3. The diagnostic device according to claim 1, wherein the sensor has at least one measuring direction orthogonal to the wall of the body of the probe.

4. The diagnostic device according to claim 1, wherein said computer is adapted to receive a signal output by the sensor during firing of the probe.

5. The diagnostic device according to claim 1, wherein said computer comprises sampling and analogue-digital conversion means, memory means and calculation means adapted to perform at least one operation of digitally processing said signal output by the sensor.

6. The diagnostic device according to claim 1, further comprising a member for slow discharge of the capacitor bank adapted to be able to be used when a failure is detected during firing of the probe.

7. A diagnostic method for a seismic probe, said probe comprising, in an elongate tubular body, an electronic module, a capacitor bank and a spark gap adapted to effect firing, generating a shock wave in a wellbore, wherein: a probe is used which is equipped with a sensor adapted to measure at least one parameter of the shock wave directly transmitted by the body of the probe over time, said sensor being fixed to an inner surface of a wall of the body at a predetermined, non-zero distance from the spark gap, a signal output by said sensor is recorded by a computer during firing, the recorded signal is processed and compared with at least one reference value, and based on the result of the comparison, the computer outputs information representing the operating state of the probe, allowing a distinction to be made, after processing, between failed firing and successful firing.

8. The diagnostic method according to claim 7, wherein the recorded signal is sent in real time to an operator station at the wellhead.

9. The diagnostic method according to claim 7, wherein the signal is recorded in a memory forming part of the on-board computer in the probe.

10. The diagnostic method according to claim 7, wherein a plurality of signals output by the sensor and recorded are used to calculate said at least one reference value.

11. The diagnostic method according to claim 10, wherein at least one of the reference values is determined from an energetic average of the recorded signals.

12. The diagnostic method according to claim 10, wherein at least one of the reference values is obtained from a spectral analysis of the recorded signals.

13. The diagnostic method according to claim 7, wherein said method comprises at least one additional step of automatically adapting control parameters of the probe when the computer outputs information representing an anomaly in the operation of the probe.

14. The diagnostic method according to claim 13, wherein at least one additional step is a step of rendering the probe safe, said step comprising stopping the power supply to the capacitor bank and switching a slow discharge member between the electrodes of the capacitor bank.

15. The device according to claim 2, wherein the sensor has at least one measuring direction orthogonal to the wall of the body of the probe.

16. The device according to claim 2, further comprising a computer adapted to receive a signal output by the sensor during firing of the probe.

17. The device according to claim 3, further comprising a computer adapted to receive a signal output by the sensor during firing of the probe.

18. The device according to claim 2, further comprising a member for slow discharge of the capacitor bank adapted to be able to be used when a failure is detected during firing of the probe.

19. The device according to claim 3, further comprising a member for slow discharge of the capacitor bank adapted to be able to be used when a failure is detected during firing of the probe.

20. The device according to claim 4, further comprising a member for slow discharge of the capacitor bank adapted to be able to be used when a failure is detected during firing of the probe.

* * * * *